F. JARECKI.

CASES FOR SHUT-OFF RODS AND STOP-COCKS FOR GAS AND WATER PIPES.

No. 7,440. Reissued Dec. 19, 1876.

WITNESSES

Robert Everett

George E. Upham

INVENTOR

Friedrich Jarecki.

Gilmore & Smith Co.

ATTORNEYS.

THE GRAPHIC CO. N.Y.

UNITED STATES PATENT OFFICE

FREDERICK JARECKI, OF ERIE, PENNSYLVANIA.

IMPROVEMENT IN CASES FOR SHUT-OFF RODS AND STOP-COCKS FOR GAS AND WATER PIPES.

Specification forming part of Letters Patent No. 181,349, dated August 22, 1876; reissue No. 7,440, dated December 19, 1876; application filed November 25, 1876.

*To all whom it may concern:*

Be it known that I, FREDERICK JARECKI, of Erie, in the county of Erie and State of Pennsylvania, have invented an Improved Case for Shut-Off Rod and Stop-Cock for Gas and Water Pipes, of which the following is a full, clear, and exact description, reference being had to the annexed drawing, forming a part of this specification, and to the letters and figures of reference marked thereon.

This invention has relation to an improvement in cases for shut-off rods and stop-cocks for gas and water pipes; and the object is to make an improved case or casing for the shut-off rod and underground cut-offs of water or gas pipes, as will be hereinafter more fully set forth.

Figure 1:
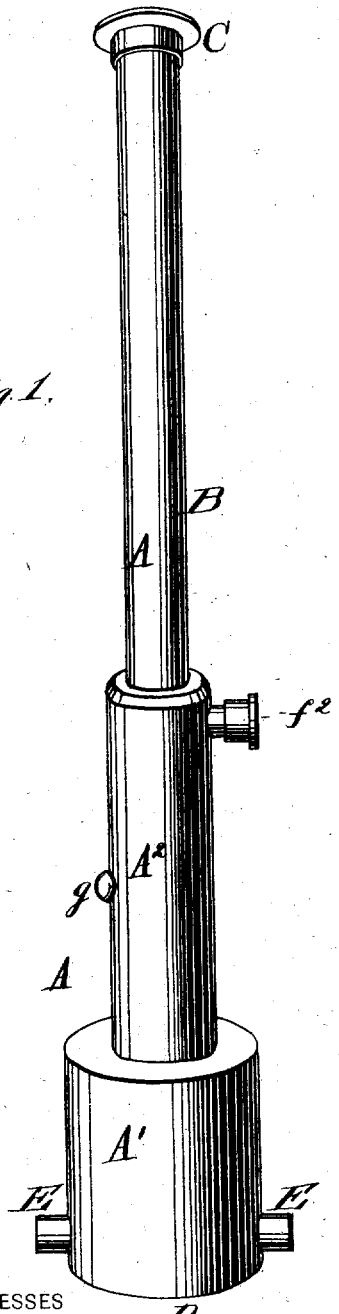
Figure 2:
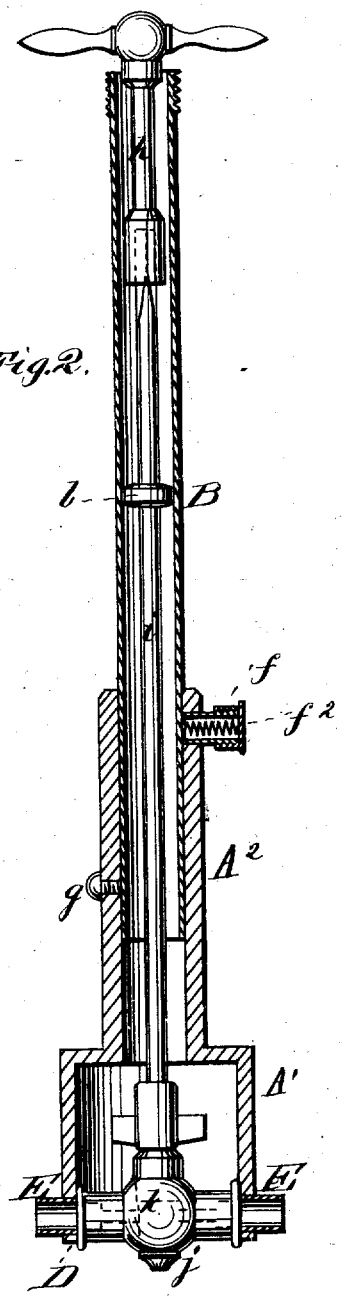

Figure 1 is a perspective view, showing my invention; and Fig. 2 is a vertical sectional view.

In the accompanying drawing, A represents the lower section of the case or casing, which is preferably cast in one piece, and having two different diameters, $A^1$ $A^2$, the larger one, $A^1$, covering the stop-cock and its connections, and the smaller one, $A^2$, covering a portion of the shut-off rod. This casing rests on a foundation at D, or on the pipes E E. The upper portion or section B of the case is usually constructed of wrought-iron gas-pipe, and fitted in the lower section. Cap C, attached to the upper end of the case B, is designed to be on a level with the sidewalk or floor, and can be unlocked, unscrewed, or slipped off from the top of the case when the rod of the stop-cock is to be reached by the key. E E are the water or gas pipes.

The spring *f* within the inclosing-cap $f^2$ bears against the lower end of the upper section B, and holds it in place by friction, so that the case is adjustable to the level of the sidewalk or floor, and will yield to the lifting force of the heaving ground and leave the lower section undisturbed.

A stop, *g*, projects into a slot near the lower end of the section B, and prevents this section from being pressed below the top of the rod *i*, or from being drawn entirely out of section A, and from turning. When the cap C is screwed off, key *h* is inserted to turn the shut-off rod *i* and stop-cock *j k*. The letter *l* designates an annular collar fixed on the shut-off rod *i*, to hold it in a vertical line.

The operation of the device is sufficiently obvious without further description.

By contracting the upper section of the case the surface-exposure is less, and a compact and durable protection is secured for the shut-off rod at small expense.

By making the case round and adjustable it is easily fitted to its place, and is not left projecting above the sidewalk when it settles.

What I claim as new, and desire to secure by Letters Patent, is—

1. A casing having two different diameters, in combination with an adjustable upper section, B, substantially as and for the purpose set forth.

2. An upper adjustable section, B, of gas-pipe, in combination with the casing A and spring *f*, substantially as and for the purpose described.

3. An upper adjustable section, B, in combination with the casing A, spring *f*, and stop *g*, substantially as and for the purpose set forth.

In testimony that I claim the above I have hereunto subscribed my name in the presence of two witnesses.

FREDERICK JARECKI.

Attest:
D. D. KANE,
J. F. ACKER, Jr.